(12) United States Patent
Matei et al.

(10) Patent No.: US 10,776,134 B2
(45) Date of Patent: Sep. 15, 2020

(54) MANAGEMENT OF APPLICATION PROPERTIES

(71) Applicant: Hewlett Packard Enterprise Development LP, Houston, TX (US)

(72) Inventors: Mihai Matei, Galway (IE); Mark Davis, Maynooth (IE); Robert McFeely, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 130 days.

(21) Appl. No.: 16/068,355

(22) PCT Filed: Jan. 7, 2016

(86) PCT No.: PCT/US2016/012464
§ 371 (c)(1),
(2) Date: Jul. 5, 2018

(87) PCT Pub. No.: WO2017/119889
PCT Pub. Date: Jul. 13, 2017

(65) Prior Publication Data
US 2019/0026129 A1 Jan. 24, 2019

(51) Int. Cl.
*G06F 1/24* (2006.01)
*G06F 9/445* (2018.01)
(Continued)

(52) U.S. Cl.
CPC ............ *G06F 9/44505* (2013.01); *G06F 9/44* (2013.01); *G06F 9/5016* (2013.01); *G06F 9/542* (2013.01); *G06F 11/30* (2013.01); *G06F 11/302* (2013.01); *G06F 11/3051* (2013.01); *G06F 11/3079* (2013.01); *G06F 9/4401* (2013.01); *G06F 2201/865* (2013.01)

(58) Field of Classification Search
CPC ...... G06F 9/44505; G06F 9/44; G06F 11/302; G06F 11/30; G06F 11/3051; G06F 11/3079; G06F 9/542; G06F 9/5016; G06F 2201/865
USPC ........................................................ 713/100
See application file for complete search history.

(56) References Cited

U.S. PATENT DOCUMENTS

| | | | | | |
|---|---|---|---|---|---|
| 6,029,196 | A | * | 2/2000 | Lenz | G06F 8/61 709/203 |
| 6,308,212 | B1 | * | 10/2001 | Besaw | G06F 9/451 709/228 |

(Continued)

OTHER PUBLICATIONS

"Spring Cloud Zookeeper"; Dec. 22, 2016; 11 pages; printed on Apr. 18, 2018; from http://cloud.spring.io/spring-cloud-static/spring-cloud-zookeeper/2.0.0.M7/single/spring-cloud-zookeeper.html#spring-cloud-zookeeper-config.

(Continued)

*Primary Examiner* — Volvick Derose
(74) *Attorney, Agent, or Firm* — Jaffery Watson Mendonsa & Hamilton (57) ABSTRACT

In an example, a system can include a processing resource and a memory resource. The memory resource can store an application property. A processing resource can provide the application property it a request for the application property is received from an application. In an example, the application property comprises at least one of an observable application property and an environmental property for the application.

17 Claims, 6 Drawing Sheets

(51) Int. Cl.
*G06F 11/30* (2006.01)
*G06F 9/44* (2018.01)
*G06F 9/50* (2006.01)
*G06F 9/54* (2006.01)
*G06F 9/4401* (2018.01)

(56) References Cited

U.S. PATENT DOCUMENTS

| | | | | |
|---|---|---|---|---|
| 7,661,091 | B2* | 2/2010 | Finocchio | G06F 9/4492 717/116 |
| 8,214,389 | B2 | 7/2012 | Lee et al. | |
| 8,321,853 | B2* | 11/2012 | Currier | G06F 8/70 707/999.1 |
| 8,583,906 | B2* | 11/2013 | Harmer | G06F 9/451 713/1 |
| 8,726,264 | B1* | 5/2014 | Allen | G06F 8/60 717/168 |
| 8,762,430 | B1* | 6/2014 | Hall | A63F 13/12 707/812 |
| 9,460,109 | B1* | 10/2016 | Hagerman | G06F 8/71 |
| 2004/0098446 | A1* | 5/2004 | Styles | H04L 41/0866 709/200 |
| 2005/0004927 | A1* | 1/2005 | Singer | G06Q 30/02 |
| 2005/0028165 | A1* | 2/2005 | McGowan | G06F 9/44505 719/310 |
| 2005/0165830 | A1* | 7/2005 | Gupta | G06F 8/24 |
| 2007/0005734 | A1* | 1/2007 | Abdo | H04L 63/0227 709/219 |
| 2008/0244623 | A1* | 10/2008 | Graser | G06F 9/4488 719/328 |
| 2009/0249290 | A1* | 10/2009 | Jenkins | G06Q 10/063 717/109 |
| 2010/0257200 | A1* | 10/2010 | Lee | G06F 16/21 707/770 |
| 2011/0047249 | A1* | 2/2011 | Pearce | G06F 17/2252 709/219 |
| 2011/0106876 | A1* | 5/2011 | Delaney | H04L 63/102 709/203 |
| 2011/0179419 | A1* | 7/2011 | Gusev | G06F 9/5061 718/100 |
| 2011/0314243 | A1* | 12/2011 | Pasternak | G06F 8/656 711/163 |
| 2012/0284686 | A1 | 11/2012 | Sharrma et al. | |
| 2013/0124807 | A1* | 5/2013 | Nielsen | G06F 11/1438 711/162 |
| 2013/0204948 | A1* | 8/2013 | Zeyliger | G06F 9/44505 709/206 |
| 2013/0283350 | A1* | 10/2013 | Afek | G06F 21/6218 726/4 |
| 2014/0032613 | A1* | 1/2014 | Hanson | G06F 16/21 707/803 |
| 2014/0280375 | A1* | 9/2014 | Rawson | G06F 16/21 707/803 |

OTHER PUBLICATIONS

12factor.net; "The Twelve-Factor App," 2 pages; printed on Dec. 14, 2015 from: http://12factor.net/config.

Apache; "A High-Performance Coordination Service for Distributed Applications"; 17 pages; printed on Aug. 26, 2015 from: http://svn.apache.org/repos/asf/bigtop/branches/branch-0.4/bigtop.

GITHUB, Inc., "Spring-Cloud/Spring-Cloud-Config," Retrieved Dec. 14, 2015 at http://github.com/spring-cloud/spring-cloud-config, 7 pages.

Lea; G.; "Feature Flags fro the Java platform"; Jun. 2, 2016; 3 pages; printed on Apr. 18, 2018 from: https://github.com/togglz/togglz.

PCT; "Notification of Transmittal of the International Search Report and the Written Opinion"; issued in Appl. No. PCT/US2016/012464; dated Sep. 30, 2016; 10 pages.

Shanghai, J. W.; "James-Wu-Shanghai-Spring-Zookeeper"; May 11, 2013; 2 pages.

Stackoverflow.com; "Zookeeper for Java/spring Config"; 3 pages; printed on Aug. 14, 2015; from: http://stackoverflow.com/questions/9940476/zookeeper-for-java-spring-config.

Yermolaiev; O.; "Managing Configuration of Distributed System with Apache ZooKeeper"; Aug. 15, 2014; 19 pages.

* cited by examiner

MANAGEMENT OF APPLICATION PROPERTIES

BACKGROUND

Computing systems can run applications which have a variety of configurations for each application. The configuration of an application can affect server processes, operating system settings, and the application during user interaction among other similar application configuration results.

BRIEF DESCRIPTION OF THE DRAWINGS

Certain examples are described in the following detailed description and in reference to the drawings, in which.

DETAILED DESCRIPTION OF SPECIFIC EXAMPLES

Application properties may be stored in property files or configuration files that are stored locally for the application. Application properties may also be stored in a separate configuration file for each instance of an application or in other piecemeal configuration storage methods. Configuration services, such as Spring Cloud-Config, may run as a separate application and provide properties from a version control systems for software development such as a git repository. While some of these services include the use of centralized application property stores, previous methods may not provide observable application properties or environmental property aggregation.

As described herein, the use of centralized application property stores may reduce the number of components. This reduction in components can ease the task of changing a configuration in one place and having the effects felt globally. With the present techniques using a centralized property manager, changing configurations globally for a system may involve fewer chances for error. The use of observable application properties and environmental property aggregation in the presently disclosed techniques allow the updating of an application configuration without restarting. This capability can be achieved because the availability of these properties from a central property manager allows application changes without proceeding to pass through a system through a dependency injection framework.

The presently disclosed techniques also help avoid errors common to management of a development environment. In an example, the presently disclosed techniques avoid the use of multiple configuration files and versions of configuration files. Use of multiple configuration files or versions of configuration files can cause problems, for example, if a developer creates a development version of an application configuration that is not ready for production use. The resulting development version configuration file could be incorrectly implemented by devices or systems or applications using an incorrect configuration.

The present techniques may be used to manage application properties that are backed up by a distributed configuration service with redundant services rather than through the traditional database or filesystem approaches. In an example, the configuration service can also be a synchronization service or a naming service for distributed systems. In an example a distributed configuration service may include Apache Zookeeper™ from Apache. The use of a distributed configuration service for managing application properties can include defining for each application the environment for property management. The use of a distributed configuration service can also include the ability to update applications either through pushing updates to the applications, or by providing an updater to the applications. The updater may monitor the configuration from the configuration service for updates. In an example, the updater may be a Java™ application that observes and reacts to property changes detected in the configuration service as the property changes are made and detected.

Figure 1:
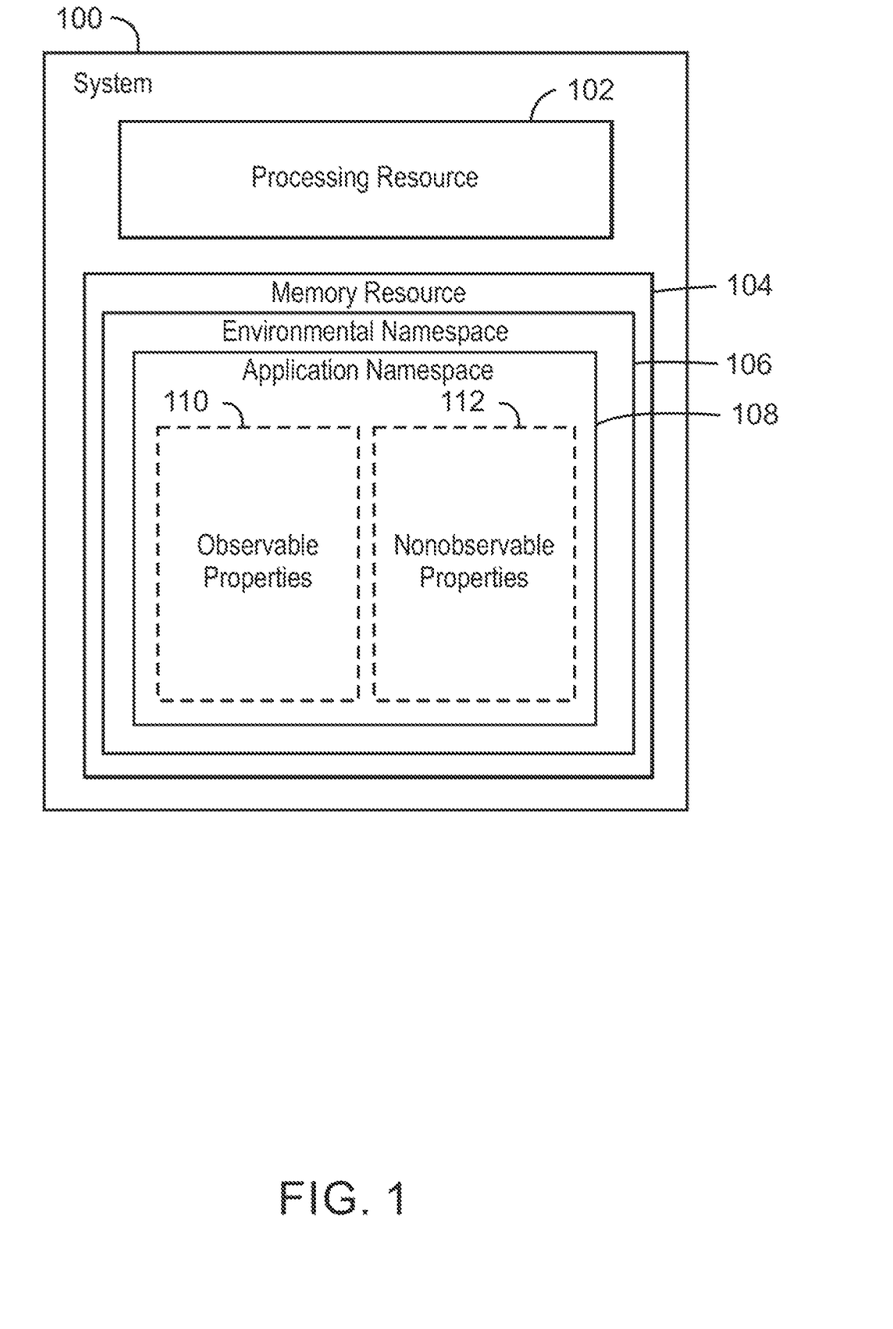
FIG. 1 is an example of a system for management of application properties.

FIG. 1 is an example of a system 100 for management of application properties. The system 100 can include a memory resource that stores a property dependency notification that can be provided to the application. The property dependency notification can alert the application that requests for an application property by the application should be directed to the system 100.

The system 100 may be, for example, a server, a laptop computer, desktop computer, ultrabook, tablet computer, mobile device, among others. As discussed above, the system 100 may include a processing resource 102 such as a central processing unit (CPU) that is configured to execute stored instructions, as well as a memory resource 104 that stores instructions that are executable by the processing resource 102. The processing resource 102 may be coupled to the memory resource 104 by a bus. The processing resource 102 can be a single core processor, a multi-core processor, a computing cluster, or any number of other configurations. Furthermore, the system 100 may include more than one processing resource 102. The processing resource 102 can also connect through a storage array interface to external storage arrays by the bus. The storage array can be an external system or array of systems that are hosting its own guest virtual machines or interacting with the virtual machines of the system 100.

The system 100 may also include a storage device. The storage device can be a non-volatile storage device such as a hard drive, an optical drive, a thumbdrive, an array of drives, or any combinations thereof. The memory resource 104 can include random access memory (RAM), flash memory, or any other suitable memory systems. For example, the memory resource 104 may include random access memory (DRAM). The memory resource 104 may include an environmental namespace 106. The environment namespace 106 may include properties that apply to an execution context for an application.

The environmental namespace 106 can include an application namespace 108 that stores and allows the organization of the properties applicable to the execution context of an application. In an example, the application namespace 108 may include application configuration information including operating system settings, networking settings, or other similar configurations. The processing resource 102 can provide the application namespace 108 in response to a request for the application namespace 108 from an application. The request can be received from a separate device or from any networked or communicatively coupled instance hosting an application whether the application is running on the local system 100 or on remote device. The application namespace 108 may include at least one of an observable application property 110 and a nonobservable application property 112 for the application. As used herein, an observable application property 110 may be a property that can be observed or accessed by any application or program with access to the application namespace 108. A nonobservable application property 112 may be a property that cannot be observed or accessed by any application or program with access to the application namespace 108.

The application properties stored in the application namespace 108 may all be environmental in nature. In an example, the application properties may each be specific to a given environment namespace. As indicated above, each application property can be observable or nonobservable. The presence of the application properties, and the application requesting the specific application properties in the application namespace allow an application property manager to notify a client about a change in property state. The framework shown here allows for the accessibility and storage of application properties for a number of clients. Each property stored within the application namespace 108 may be simultaneously accessed through a number of configurations, for a number of client devices, and updated through a number of systems. The application property storage framework shown here facilitates an observer pattern in the framework for application property management.

In an example, a property management service may push notify clients about changes in property state of an observable application property 110 or a nonobservable application property 112. The retrieval of specific properties may increase the convenience to client devices that may not manage their own application properties. In this example, these application that rely on property management systems can implement listeners that react to those state changes without the use of regular polling for changes, application generated property files, or other similar solutions.

The block diagram of FIG. 1 is not intended to indicate that the computing device is to include all of the components shown in FIG. 1. Further, the system 100 may include any number of additional components not shown in FIG. 1, depending on the details of the specific implementation.

Figure 2:
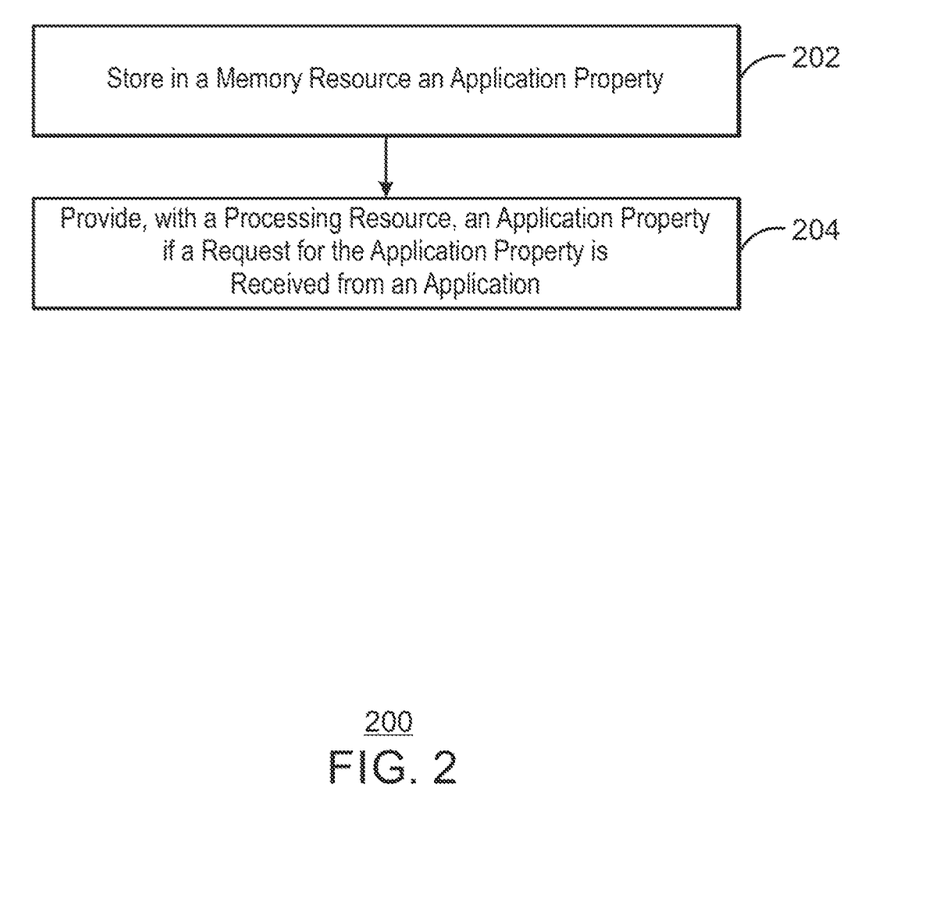
FIG. 2 is a flow diagram of an example method for management of application properties.

FIG. 2 is a flow diagram of an example method 200 for management of application properties. The method 200 begins at block 202.

At block 202, a memory resource stores an application property. The application property can include at least one of an observable application property and an environmental property for the application. The environmental properties for the application can apply to a cluster of a plurality of devices each running an instance of the application. If the memory resource stores a property dependency notification to be provided to the application, the application can use the property dependency notification to identify and save a location of the memory resource providing the application property. In an example, the property dependency notification directs the application to request the application property from the memory resource each time an application property is needed. In an example, upon the startup of an application, an application property can be requested from the memory resource that indicates a configuration of the application. In an example, the property dependency notification can include an internet protocol address that directs the application to the memory resource where the application property can be accessed.

At block 204, a processing resource provides the application property if a request for the application property is received from an application. In an example, the memory resource can store an observer updater. The processing resource can provide the observer updater to the application. In an example, the observer updater can be provided by the processing resource when a request for the application property is received from the application. When the observer updater arrives at the application, the observer updater may allow the application to implement an observer to react to changes to the application property stored in the memory resource. The observer can be a watching function that can be continuously checking the status of the memory resource for updates to the application property. In an example, the infrastructure for the memory resource and processor is a distributed configuration service, synchronization service, and naming registry that can store the application property in a node to be read by a number of different instances of an application.

Figure 3:
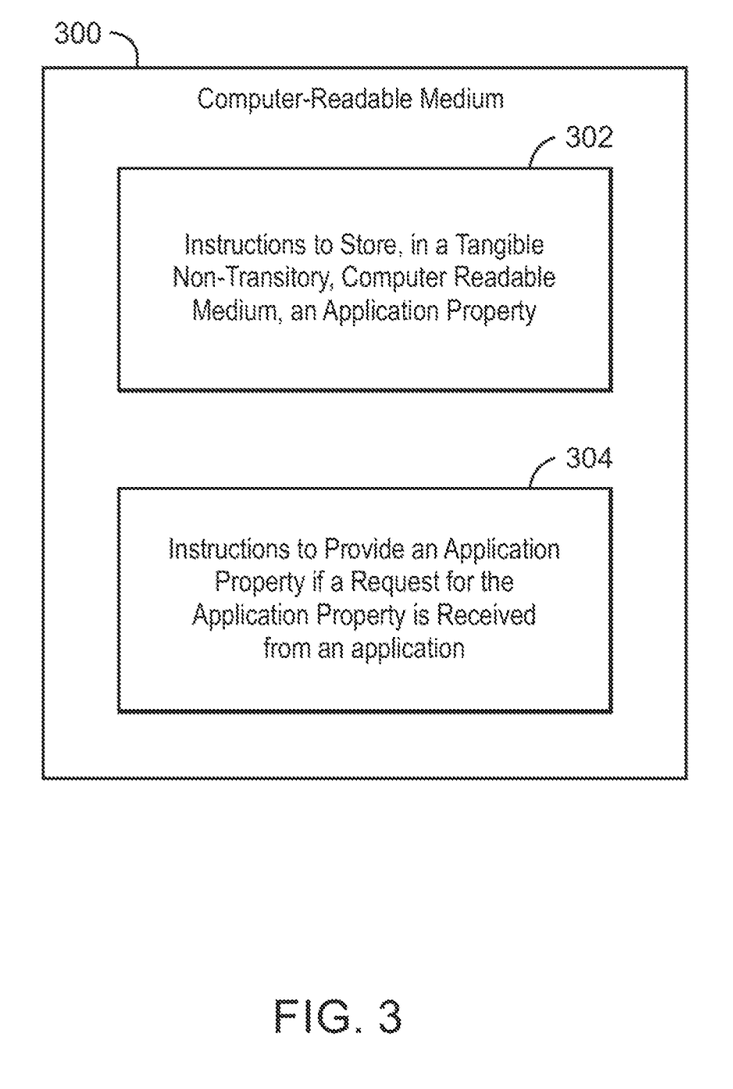
FIG. 3 is a block diagram of an example non-transitory, computer-readable medium comprising code that when executed by a processor manages application properties.

FIG. 3 is a block diagram of an example non-transitory, computer-readable medium 300 comprising code that when executed by a processor manages application properties. The computer-readable medium 300 can be accessed by a processor over a system bus. In some examples, the code may direct the processor to perform the steps of the current method as described with respect to FIG. 2. Like numbered items are as described in FIG. 1.

The computer-readable medium 300 can include instructions 302 to store in a computer-readable medium 300 an application property. In an example, the application property can include at least one of an observable application property and an environmental property for the application. The computer-readable medium 300 can also include instructions to provide 304 an application property to an application if a request for the application property is made to the computer-readable medium.

In an example, the computer readable medium stores an observer updater, where the processor provides the observer updater to the application if a request for the application property is received from the application. In this example, once the observer updater is sent to the application, the observer updater can assist the application in implementing an observer. The observer may react to detected changes to the application property stored in the computer-readable medium.

In an example, the computer-readable medium and processor may store the infrastructure for a distributed configuration service, synchronization service, and naming registry. The infrastructure may be used to store the application property in a node that can later be read by a number of different instances of the application. In an example the reading of a node containing an application property is initiated by an observer. The observer updater can include instructions that an application can implement to check an application property node for updates to the application property.

The block diagram of FIG. 3 is not intended to indicate that the computer-readable medium 300 is to include the components or modules shown in FIG. 3. Further, any number of additional components may be included within the computer-readable medium 300, depending on the details of the management of application properties disclosed herein.

Figure 4:
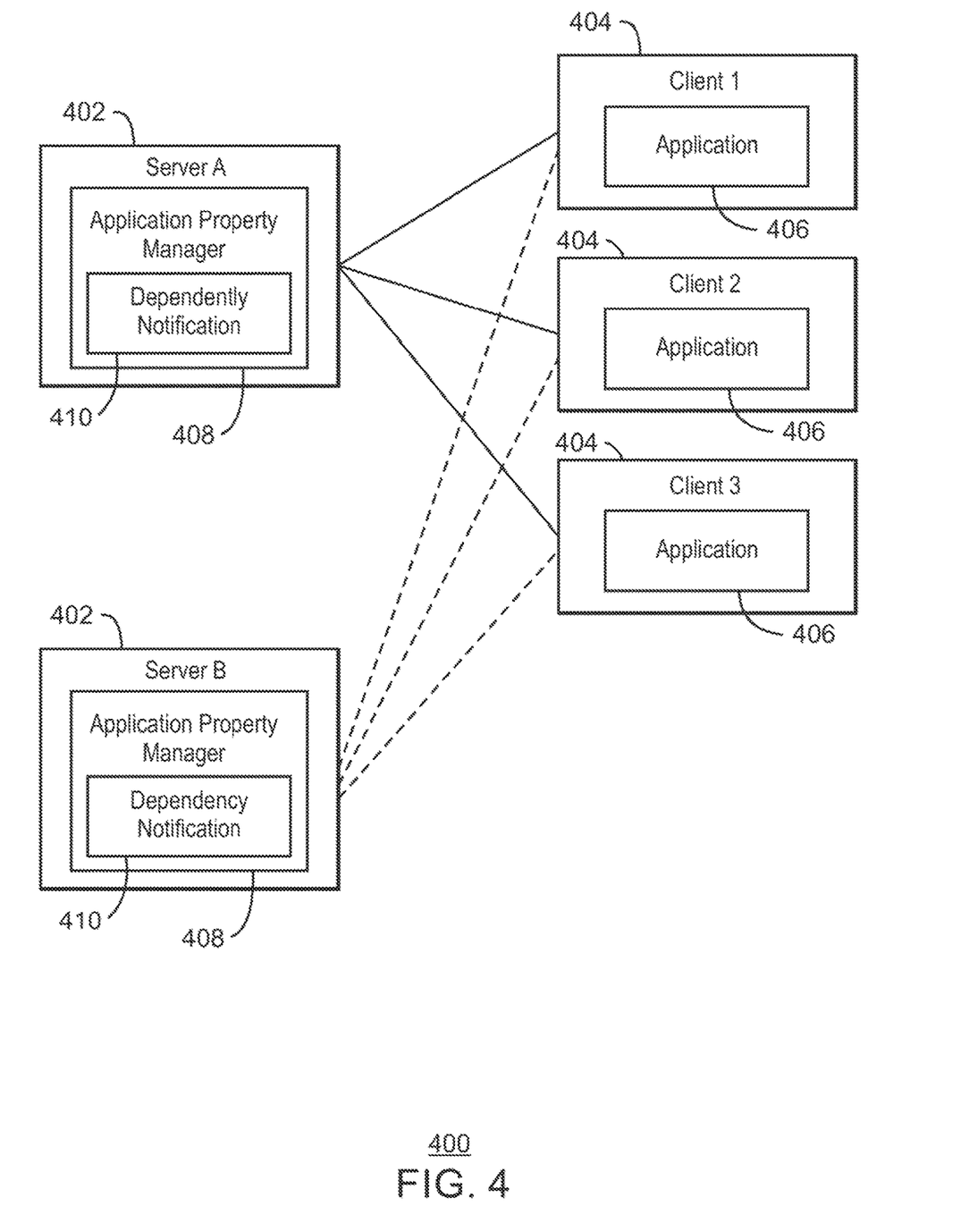
FIG. 4 is an example schematic diagram of multiple servers managing the applications for multiple clients.

FIG. 4 is schematic diagram 400 of multiple servers managing the applications for multiple clients. Like numbered items are as described here and as in FIG. 1. The techniques herein disclosed may be implemented on the Server 402 side. In an example however, the techniques can involve implementation across multiple Servers 402 and Clients 404. Each client 404 may be a device or virtual machine executing an application 406. The application 406 can include software, operating systems, networking logic, or other similar implementations. In an example, the application 406 can be written in Java™ and can be used to manage properties in many components. In an example, the application 406 can include components or settings that are managed for various digital locations including Representational State Transfer (REST) Application Program Interfaces (APIs), storm clusters in topologies, and for other places. The management of the application's 406 properties can be executed from an application property manager 408 in a Sever 402.

In an example, when an application property is managed by the application property manager 408, each application 406 can engage with at least two environment properties. In an example these two properties can store information on the development environment and on the address on a cluster where the environmental properties are stored and defined. In an example where Apache ZooKeeper™ implements these properties, the properties can be referred to as the PS_ENVIRONMENT property and the PS_ZOOKEEPER_QUORUM respectively. When the development environment property and address of the application properties for an application 406 are defined, the application 406 can use a property service class to access application properties 406. The application property manager 408 can also implement an observer pattern in the application 406 so the consuming applications 406 can add observers which will react to property changes at the application property manager 408.

Server A (402) can store the application property manager 408 that Client 1-3 (404) each refer to upon the application 406 requesting an application property. Upon an initial request by any of the clients 404, Server A (402) can provide, from the application property manager 408, a dependency notification 410. The dependency notification can be provided to each of the Clients 1-3 (404). The dependency notification can be received by the application 406 and provide the application 406 notice that if the application 406 requests an application property, the application 406 can request the property from Server A (402), and more specifically, from the application property manager 408 of Server A (402).

An application 406 that is consuming a dependency notification adds a dependency on the property service module of the application 406. When an application property changes in Server A (402), these changes can be detected by the application 406 which can update the properties of the application 406 while being implemented on a client 404. In an example, each of the applications in Client 1 (404), Client 2, (404), and Client 3 (404), can each consult the application property manager 408 of Server A (402).

If the communicative connection to Server A (402) loses functionality, the Clients 1-3 (404) can request application property management from Server B (402). The application property manager 408 of Server B (402) may include synchronized properties from either Server A (402) prior to it disconnecting, or from a client 404 that has most recently updated its application properties prior to the disconnect. Upon a client's 404 request for an application property from Server B (402), the application property manager 408 can provide a dependency notification 410 to the Clients 1-3 (404). The dependency notification 410 from Server 8 (402) can update the dependency information in each client 404 that requests and receives it.

In an example, the dependency notification 410 also includes an address identifier, such as a uniform resource locator for the server providing the dependency notification. In an example, rather than a server identification, a cluster identification for a group of servers or a cloud can be provided to indicate a location a client 404 using an application 406 can request an application property.

Figure 5:
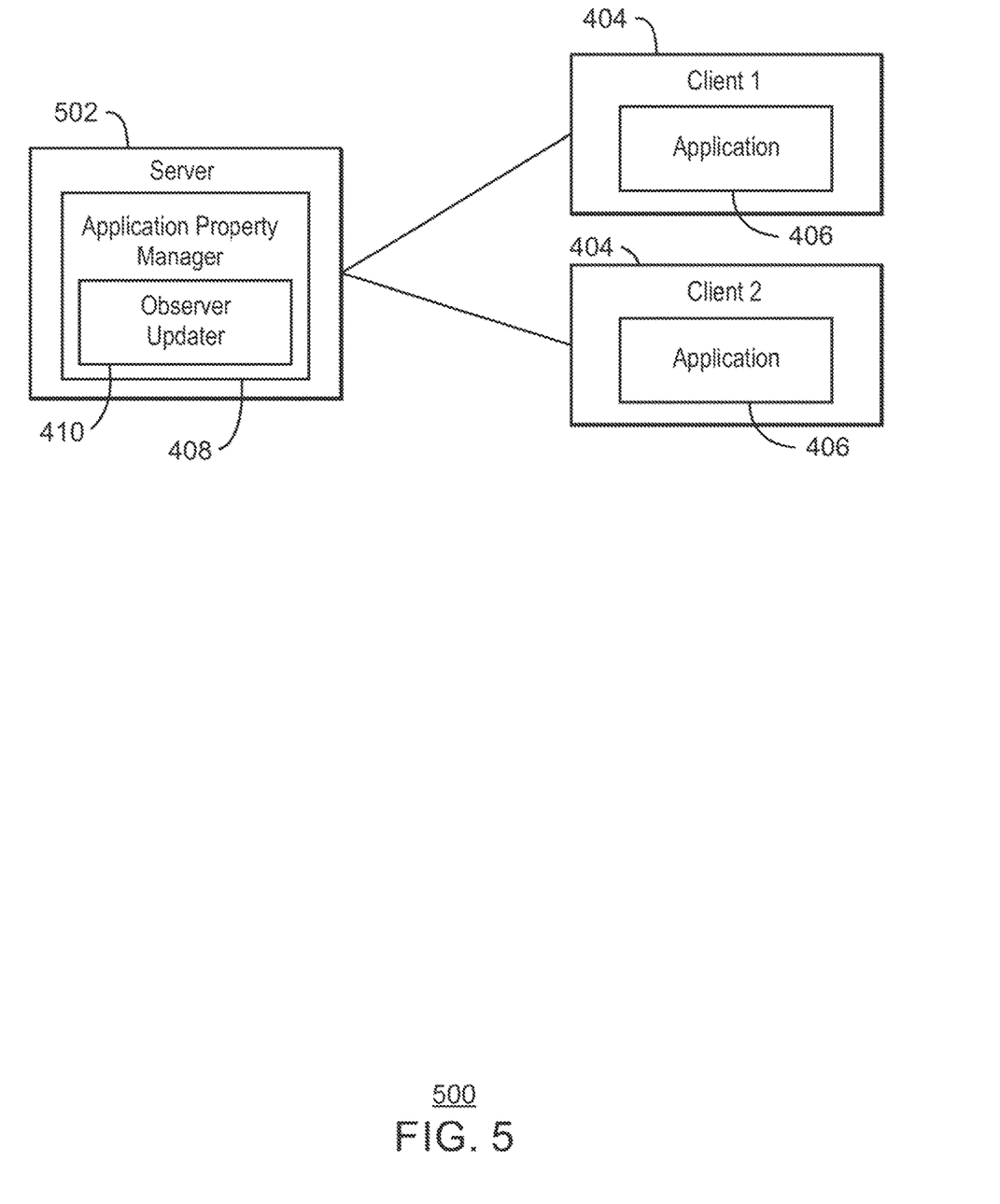
FIG. 5 is an example schematic diagram of multiple servers for managing application properties and providing an observer updater to clients.

FIG. 5 is schematic diagram 500 of multiple Servers 502 for managing application properties and providing an observer updater to clients 404. Like numbered items are as described in FIG. 1 and FIG. 4.

The Sever 502 can include an application property manager 504 storing an observer updater 506 that can be sent to a client 404. Upon a request, the Sever 502 can provide, through the application property manager 504, an observer updater 506 to the requesting client 404. As depicted in FIG. 5, Client 1 (404) and Client 2 (404) can both access application properties from the Server 502. Indeed, the centralized management of application properties for each application 406 allows the near instant updating of the configuration of the application properties at each application 406 with changes only made at the application property manager 504. In an example, the observer updater 506 can be sent to an application 406 to allow access of the application 406 to an observer. The observer can monitor the application property manager 408 for changes to application properties that could impact the application 406. Through the use of an observer, the application can access properties from the application property manager 504 as soon as those properties undergo a change. In an example, the observer can access an Apache ZooKeeper™ infrastructure to retrieve the updated application property.

In an example, if an application reacts to changes in logging level, an observer can monitor a "rootLogger.level" application property in the application property manager 504 for any changes. Rather than hardcoding in a logging level in the application, a user such as support staff implementing the example relying on a logging level can adjust logging in a distributed production environment.

In an example, the application property manager 504 can leverage existing infrastructure of the deployment environment to manage the applications 406. For example, if Apache Zookeeper™ infrastructure exists in the deployment environment, a server can use functions and structures provided by Apache ZooKeeper™ to manage the application properties. In an example where the infrastructure for application management exists already, the use of this development infrastructure can help reduce the computational expense of running of an extra application on the Sever 502 to store the application properties. For example, the techniques disclosed here may help avoid deployments that rely on extra applications being run on the server, e.g. Spring-Cloud deployments.

Figure 6:
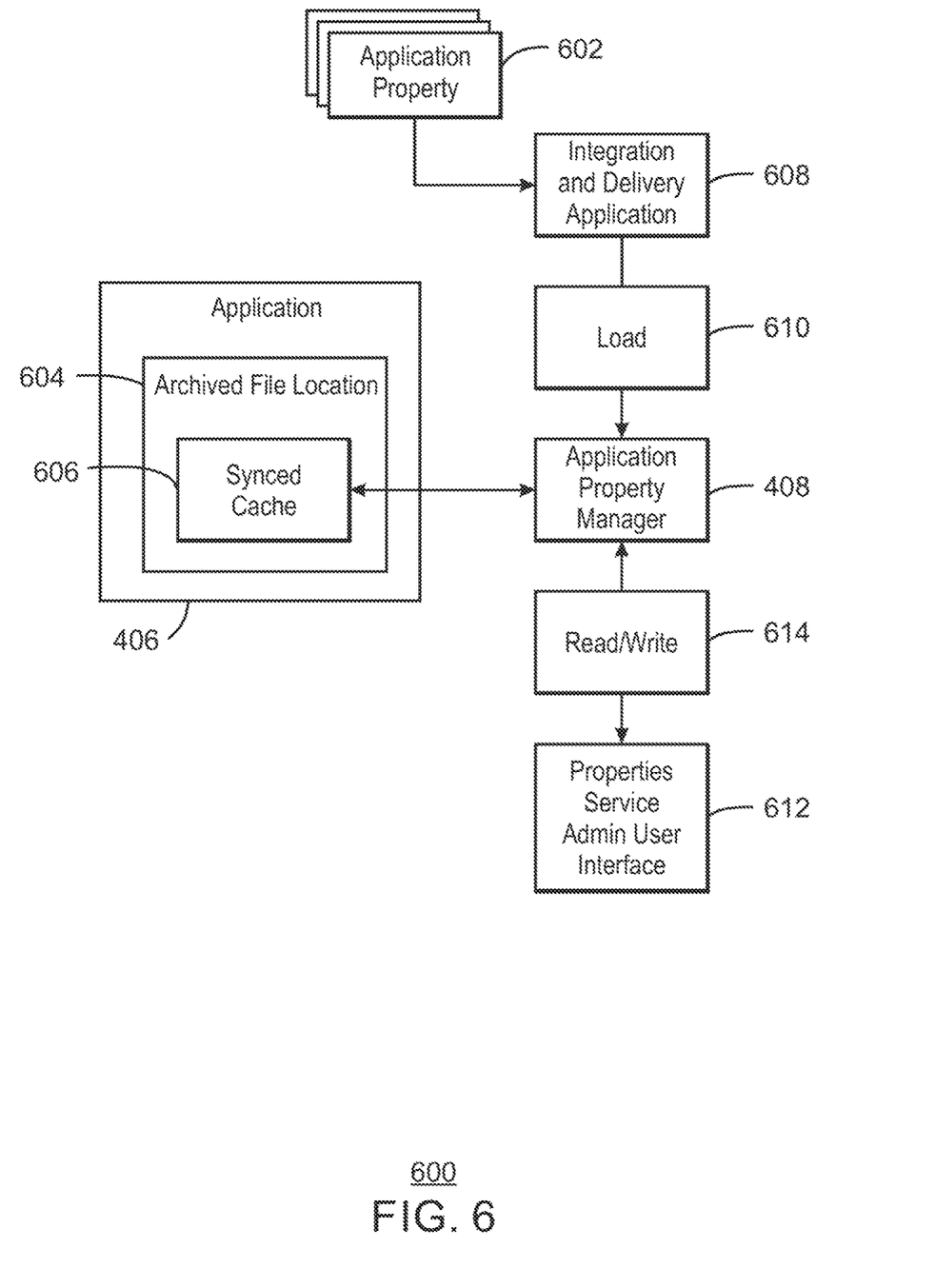
FIG. 6 is an example schematic diagram of a property management service framework for managing application properties to a synched cache for an application.

FIG. 6 is an example schematic diagram of a property management service framework for managing application properties to a synched cache for an application. The framework 600 of FIG. 6 can be used to implement the method described in FIG. 2 and the techniques shown in FIGS. 4 and 5.

The framework 600 serves an application 406 which has properties stored remotely as application properties 602. The application properties can include application configuration information including operating system settings, networking settings, or other similar configurations. An application property manager 408 may ensure that the application includes the up to date application property 602 and also that the remotely stored application properties 602 are updated to reflect changes made to those application properties 602. Changes to the application properties can be manually input by a user operating an application 406 or other suitable means for property adjustment.

The application 406 can include an archived file location 604 which include or point to a synced cache 608. The archived file location 604 can store application properties that are incoming or have been changed and will send updates to the application property manager 408. In an example, the synced cache 606 synchronizes with the application property manager to receive properties from the application property manager 408 that are most up to date. In an example, the application 406 updates an application property 602 and this update is stored in the synched cache 606. When the synched cache 606 synchronizes with the application property manager, the synched cache will provide those updates so that they may be applied to the remotely stored application properties 602.

As described above, a synched cache 606 of an application can also receive application properties 602 provided by an application property manager 408. In an example, an application property 602 has been modified in a single remote location but this modification is only made to the application property in the single remote location. In this example, the application property 602 may be provided to an integration and delivery application 608 which may continuously provide the most recent application property 602 to the application property manager 408. The providing of this application property 602 either initially or upon an update can result in the integration and delivery application 608 providing a load 610 to the application property manager 408. This load 610 can vary and may be managed by the integration and delivery application such that the most recent application property 602 instance may be selected and provide to the application property manager 408.

Direction of various application properties 602 can be handled by the application property 408 and directed by the properties service admin user interface (UI) 612. The properties service admin UI 612 may expose itself to a user for manipulation of an application property 602 generally, or also the application property for a local version of an application 406. In an example, the application property manager 408 may also provide application properties 602 to the properties service admin UI 612 so that the properties service admin UI 612 can modify or read the appropriate and updated application properties 602. In an example, the data of an application property 602 or a modification to an application property 602 may travels from the properties service admin UI to the application property manager 408 or the other direction. Using this framework, an application property manager 408 can manage application properties 408 and keep updated application properties provided to an application 406 through a synched cache 606 in accordance with input provided at the properties service admin UI 612.

While the present techniques may be susceptible to various modifications and alternative forms, the examples discussed above have been shown by way of example. It is to be understood that the techniques are not intended to be limited to the particular examples disclosed herein. Indeed, the present techniques include all alternatives, modifications, and equivalents falling within the scope of the appended claims.

What is claimed is:

1. A system for management of application properties, the system comprising:
   a memory resource having stored therein the application properties, wherein the application properties comprise a plurality of observable application property properties and an environmental property for an application, wherein the environmental property specifies a location at which the application properties are stored and defined, and wherein the plurality of observable application properties define a configuration of the application;
   a processing resource and
      a non-transitory computer-readable medium, coupled to the processing resource, having stored therein instructions that when executed by the processing resource cause the processing resource to:
         facilitate retrieval by the application of a first observable application property of the plurality of observable application properties by providing a dependency notification to the application specifying an address identifier for the system, and
         facilitate reaction by the application responsive to changes to a second observable application property of the plurality of observable application properties by allowing the application to add an observer updater for the second observable application property that pushes notifications to the application responsive to the changes.

2. The system of claim 1, wherein the environmental property for the application applies to a cluster of a plurality of devices each running an instance of the application.

3. The system of claim 1, wherein the property dependency notification comprises an internet protocol address to allow the application to address the memory resource.

4. The system of claim 1, wherein an infrastructure of the memory resource and processing resource comprises a distributed configuration service, synchronization service, and naming registry having stored therein the application properties in a node to be read by different instances of the application.

5. The system of claim 1, wherein the address identifier comprises a uniform resource locator.

6. The system of claim 1, wherein the second observable application property comprises a logging level, and wherein a change to the logging level causes each instance of the application in a distributed production environment to adjust logging performed by the instance.

7. A method for management of application properties comprising:
   storing the application properties in a memory resource of a computer system, wherein the application properties comprise a plurality of observable application properties and an environmental property for an application, wherein the environmental property specifies a location at which the application properties are stored and defined, and wherein the plurality of observable application properties define a configuration of the application;
   facilitating, by a processing resource of the computer system, retrieval by the application of a first observable application property of the plurality of observable application properties by providing a dependency notification to the application specifying an address identifier for the computer system; and
   facilitating, by the processing resource, reaction by the application responsive to changes to a second observable application property of the plurality of observable application properties by allowing the application to add an observer updater for the second observable application property that pushes notifications to the application responsive to the changes.

8. The method of claim 7, wherein the environmental property for the application applies to a cluster of a plurality of devices each running an instance of the application.

9. The method of claim 7, wherein the property dependency notification comprises an internet protocol address to allow the application to address the memory resource.

10. The method of claim 7, wherein an infrastructure of the memory resource and processor resource comprises a distributed configuration service, synchronization service, and naming registry that stores the application property in the computer system to be read by a number of different instances of the application.

11. The method of claim 7, wherein the address identifier comprises a uniform resource locator.

12. The method of claim 7, wherein the second observable application property comprises a logging level, and wherein a change to the logging level causes each instance of the application in a distributed production environment to adjust logging performed by the instance.

13. A tangible, non-transitory, computer-readable medium comprising instructions that, when executed by a processor of a computer system, direct the processor to manage application properties, the instructions to direct the processor to:

store the application properties in a memory resource of a computer system, wherein the application properties comprise a plurality of observable application properties and an environmental property for an application, wherein the environmental property specifies a location at which the application properties are stored and defined, and wherein the plurality of observable application properties define a configuration of the application;

facilitate retrieval by the application of a first observable application property of the plurality of observable application properties by providing a dependency notification to the application specifying an address identifier for the computer system; and facilitate reaction by the application responsive to changes to a second observable application property of the plurality of observable application properties by allowing the application to add an observer updater for the second observable application property that pushes notifications to the application responsive to the changes.

14. The computer-readable medium of claim 13, wherein an infrastructure of the computer-readable medium and processor comprises a distributed configuration service, synchronization service, and naming registry to store the application property in the computer system to be read by different instances of the application.

15. The computer-readable medium of claim 13, wherein the property dependency notification comprises an internet protocol address to allow the application to address the memory resource.

16. The computer-readable medium of claim 13, wherein the address identifier comprises a uniform resource locator.

17. The computer-readable medium of claim 13, wherein the second observable application property comprises a logging level, and wherein a change to the logging level causes each instance of the application in a distributed production environment to adjust logging performed by the instance.

* * * * *